Oct. 4, 1927.

J. L. BREDAR 1,644,412

SHIM

Filed May 12, 1923

J. L. Bredar, Inventor

By C. A. Snow & Co.

Attorney

Patented Oct. 4, 1927.

1,644,412

UNITED STATES PATENT OFFICE.

JOSEPH L. BREDAR, OF ROCK ISLAND, ILLINOIS.

SHIM.

Application filed May 12, 1923. Serial No. 638,615.

This invention relates to a shim for use in connection with universal joints and more particularly for use in the universal joint of Ford cars.

The object of the invention is to provide a shim for taking up wear in the universal joint of a Ford car and which is so constructed that when applied it will be securely held in operative position by the clamping flanges of the ball joint cap.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings:—

Figure 1:
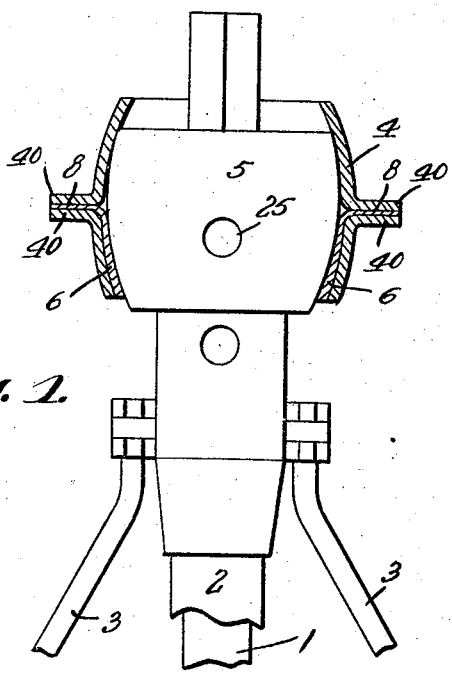
Figure 1 represents a plan view of a universal joint equipped with this invention, parts appearing in section.
Figure 2:
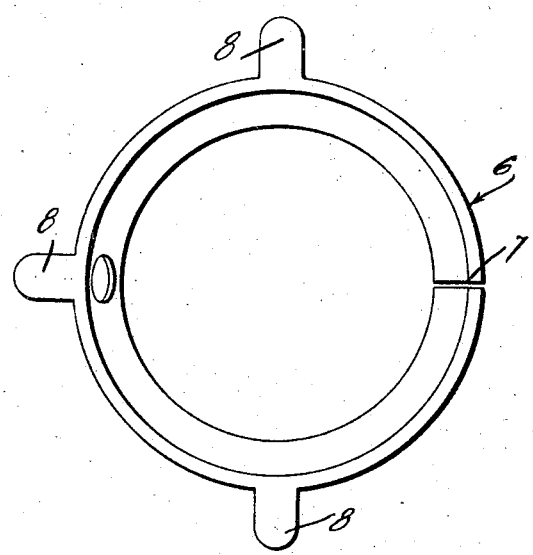
Fig. 2 is an end elevation of the shim.

In the embodiment illustrated a differential shaft of a motor propelled vehicle is shown at 1 and located within the shaft tubing 2, said tubing supporting the radius rods 3 in the ordinary manner. A ball cap 4 is shown and includes cooperating sections having flanges 40 abutting at their meeting edges. Within the cap 4 is located a joint housing 5 carried by the tubing 2 and provided with a grease hole 25, a similar hole being provided in the cap 4 to receive the stem of a grease cup 10.

Figure 3:
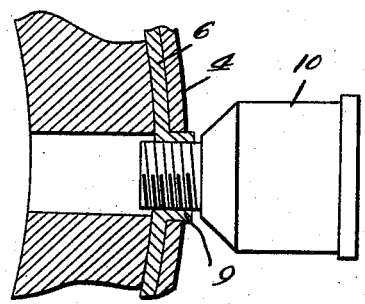
Fig. 3 is a transverse section taken through a portion of the shim and through a portion of the joint housing.

The shim 6 constituting the invention is made annular in form and composed of suitable metal being divided as shown at 7 to form relatively movable ends. This shim 6 has more or less resiliency and is so shaped in cross section as to fit between the ball cap 4 and the housing 5 as is shown clearly in Figure 1. This shim 6 may be of any desired thickness and may be supplied of different thicknesses for use in joints in which more or less wear has taken place. At its wider end the shim 6 is provided with a plurality of radially extending fingers 8 three being here shown and which are designed to be placed between the flanges 40 of the cap sections as is shown in Figure 1 whereby the shim is securely held in position against movement. The shim 6 further carries an outwardly projecting nipple 9 which extends through the cap 4 and which assists in preventing the rotation of the shim. The oil cup 10 shown in Fig. 3 is mounted on the nipple 9 and discharges through the opening 25 into the joint housing 5.

When the shim 6 is mounted in place between the ball cap 4 and the housing 5 wear between these parts will be taken up and chattering of the rear wheels incident to the excessive play of the ball joint will be prevented.

Various changes in the form, shape, proportion and other minor details of construction may be made without departing from the principle or sacrificing any of the advantages of the claimed invention.

I claim:

1. A shim of the class described comprising a transversely split annular member curved transversely and provided at its wider end with radially extending fingers.

2. A shim of the class described comprising a transversely split annular member curved transversely and provided at its wider end with a plurality of outwardly extending, lateral, peripherally spaced fingers, said shim having an outwardly projecting nipple for the reception of the stem of the grease cup.

3. In a motor propelled vehicle, a universal joint comprising a joint housing having an oil hole; a ball cap about the housing having an aperture to register with said hole, and an annular shim located between the cap and the housing and supplied with a nipple cooperating with the oil hole and received in the aperture in the ball cap.

4. In a motor propelled vehicle, a universal joint comprising a joint housing, a ball cap about the housing; and an annular shim located between the cap and the housing and severed transversely to form relatively movable ends permitting the shim to accommodate itself to the housing and to the ball cap.

5. The combination with a universal joint housing having a ball cap about the housing composed of detachably connected flanged sections, one of said sections having an opening therein; of a transversely split annular shim for insertion between one of said cap sections and said housing, said shim tapering toward one end and provided at its wider end with a thinned outturned flange to enter the space between the flanges of the ball cap sections, said shim having an outwardly projecting nipple extending throughout the aperture in the ball cap to receive the stem of a grease cup whereby the shim is held against rotation.

6. A shim of the class described comprising a transversely split annular member curved transversely with its wider end thinned to form an outwardly extending flange, said shim having an outwardly projecting nipple for the reception of the stem of the grease cup.

7. A shim of the class described comprising a transversely split annular member curved transversely with its wider end thinned to form an outwardly extending flange to provide securing means for the shim.

8. For use in a motor vehicle having a universal joint, a ball shaped housing for said joint, a ball cap surrounding said housing, an annular resilient shim located between the outer surface of said housing and the inner surface of said cap and severed transversely, said shim serving to take up wear between said housing and said cap.

9. For use in a motor vehicle having a universal joint, a ball shaped joint housing and a ball cap therefor; an annular shim or bushing to be located between the cap and the housing, said shim being shaped to fit the internal surface of said cap and severed transversely, whereby it may be expanded or contracted to fit the internal surface of the cap.

In testimony that I claim the foregoing as my own, I have hereto affixed my signature.

JOSEPH L. BREDAR.